(12) United States Patent
Cheng

(10) Patent No.: US 10,080,456 B2
(45) Date of Patent: Sep. 25, 2018

(54) FOOD COMPRESSION APPARATUS

(71) Applicant: URBAN TREND, LLC, Newport Beach, CA (US)

(72) Inventor: Philip Cheng, Ma On Shan (HK)

(73) Assignee: Urban Trend LLC, Newport Beach, CA (US)

( * ) Notice: Subject to any disclaimer, the term of this patent is extended or adjusted under 35 U.S.C. 154(b) by 107 days.

(21) Appl. No.: 14/995,984

(22) Filed: Jan. 14, 2016

(65) Prior Publication Data
US 2017/0202387 A1 Jul. 20, 2017

(51) Int. Cl.
A47J 19/00 (2006.01)
A47J 19/02 (2006.01)
A47J 19/04 (2006.01)

(52) U.S. Cl.
CPC .......... *A47J 19/005* (2013.01); *A47J 19/022* (2013.01); *A47J 19/04* (2013.01)

(58) Field of Classification Search
CPC ......... A47J 19/005; A47J 19/022; A47J 19/04
USPC ........................................ 100/234, 262, 254
See application file for complete search history.

(56) References Cited

U.S. PATENT DOCUMENTS

| | | | | |
|---|---|---|---|---|
| 382,774 A * | 5/1888 | Shea | ...................... | A47J 19/022 100/131 |
| 769,785 A * | 9/1904 | Bruen | ................... | B30B 9/3064 100/135 |
| 1,840,182 A * | 1/1932 | Bailey | ................... | A47J 19/022 100/245 |
| 2,151,500 A * | 3/1939 | Cecil | ...................... | A47J 19/022 100/131 |
| 2,318,784 A * | 5/1943 | Koch | ...................... | A47J 19/022 100/125 |
| 2,506,970 A * | 5/1950 | Milton | ................... | A47J 19/022 100/229 R |
| 2,534,554 A * | 12/1950 | Kahre | ................... | A47J 19/022 100/125 |
| 2,581,294 A * | 1/1952 | Read | ...................... | A47J 19/022 100/125 |
| 2,584,333 A * | 2/1952 | Crot | ...................... | A47J 19/022 100/226 |
| 4,253,351 A | 3/1981 | Allen | | |
| 8,322,277 B2 | 12/2012 | Griffith | | |
| 2006/0192042 A1* | 8/2006 | So | ......................... | A47J 19/005 241/95 |
| 2012/0228417 A1* | 9/2012 | Connelly | ................. | A47J 19/04 241/201 |

OTHER PUBLICATIONS

Linear Definition—Google ; https://www.google.com/search?q=linear&oq=linear&aqs=chrome..69i57j69i59j0l4.1567j0j8&sourceid=chrome&ie=UTF-8.*
FreshForce Potato Ricer YouTube publish date: Published on Sep. 16, 2013 https://www.youtube.com/watch?v=pT4FFUcVB_E.

(Continued)

Primary Examiner — Jessica Cahill
Assistant Examiner — Joseph Finan, Jr.
(74) Attorney, Agent, or Firm — Greenberg Traurig, LLP

(57) ABSTRACT

An apparatus for compressing food includes a receptacle for receiving the food, a lever coupled to the receptacle, a piston, and a rack-and-pinion assembly coupled to the lever and to the piston such that actuation of the lever is converted by the rack-and-pinion assembly into movement of the piston into and out of the receptacle.

19 Claims, 7 Drawing Sheets

(56) References Cited

OTHER PUBLICATIONS

FreshForce Garlic Press YouTube publish date: Uploaded on May 18, 2011 https://www.youtube.com/watch?v=VhSqD4JmNas.
FreshForce Citrus Juicer YouTube publish date: Published on Sep. 16, 2013 https://www.youtube.com/watch?v=58wJLg8Ot7g.

\* cited by examiner

FOOD COMPRESSION APPARATUS

BACKGROUND a. Technical Field

The present disclosure relates to an apparatus for compressing food, which apparatus may be, for example, a potato ricer, a citrus juicer, a garlic press, and the like.

b. Background Art

Food compression devices, such as potato ricers, citrus juicers, and garlic presses, are generally known. Such devices generally enable a user to actuate a lever to compress a desired food—potatoes, citrus, or garlic, for example—into or through a receptacle.

DETAILED DESCRIPTION

Figure 1:
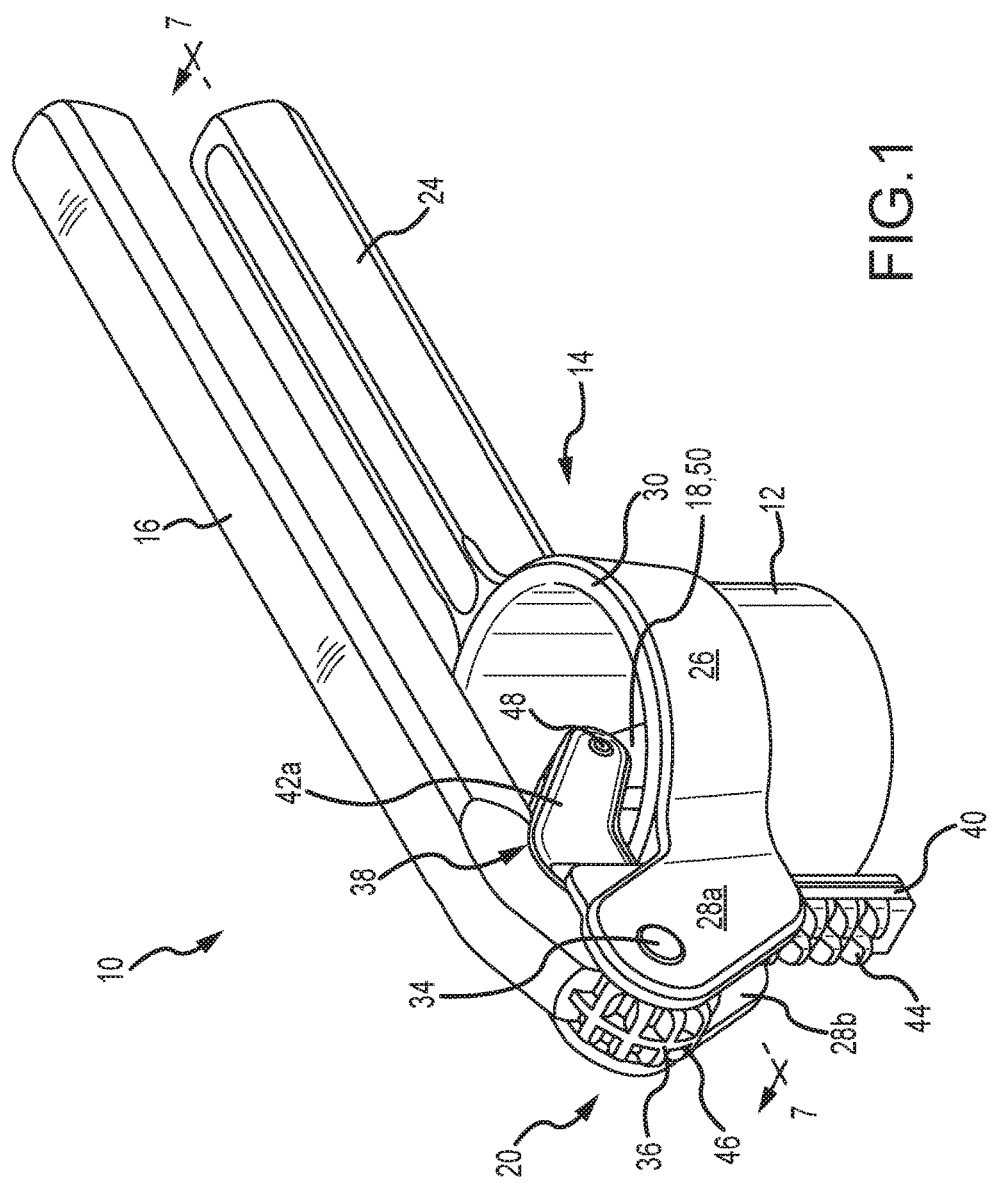
FIG. 1 is an isometric view of an exemplary embodiment of an apparatus for compressing food.
Figure 2:
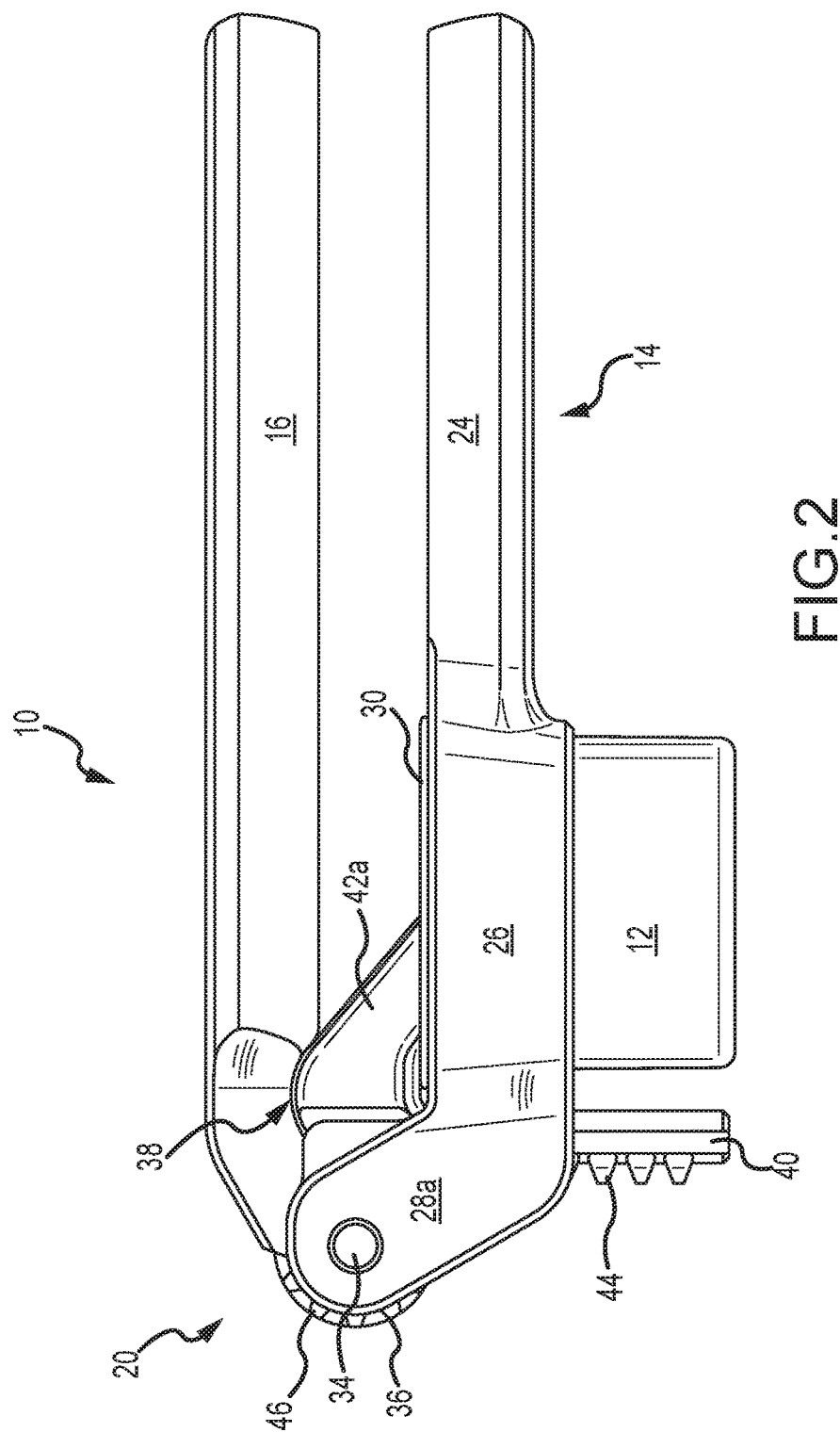
FIG. 2 is a left side view of the apparatus of FIG. 1.
Figure 3:
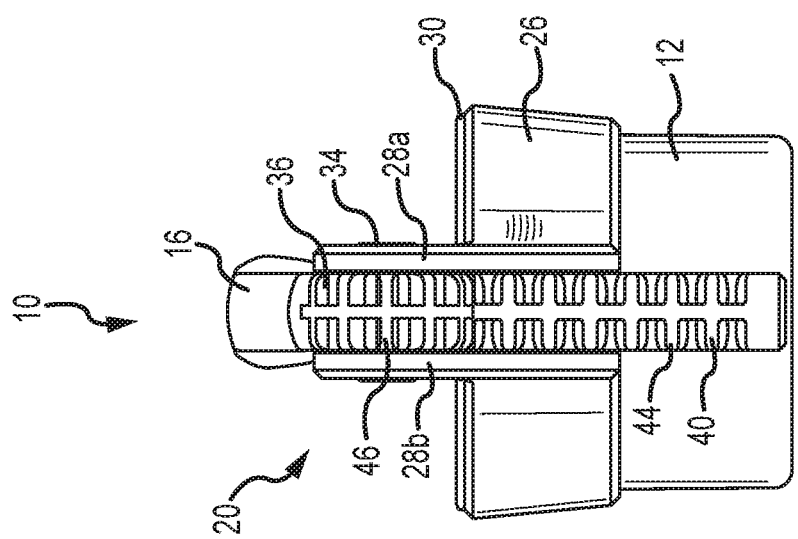
FIG. 3 is a distal end view of the apparatus of FIG. 1.
Figure 4:
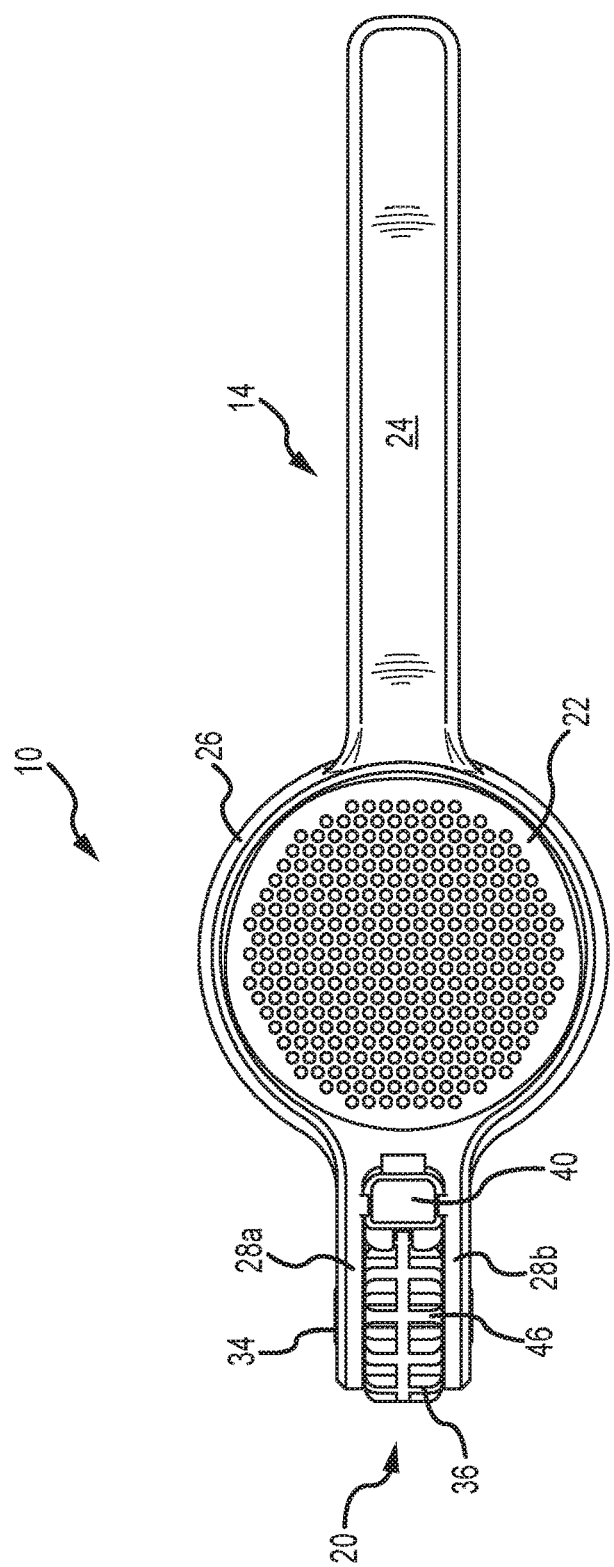
FIG. 4 is a bottom view of the apparatus of FIG. 1.
Figure 5:
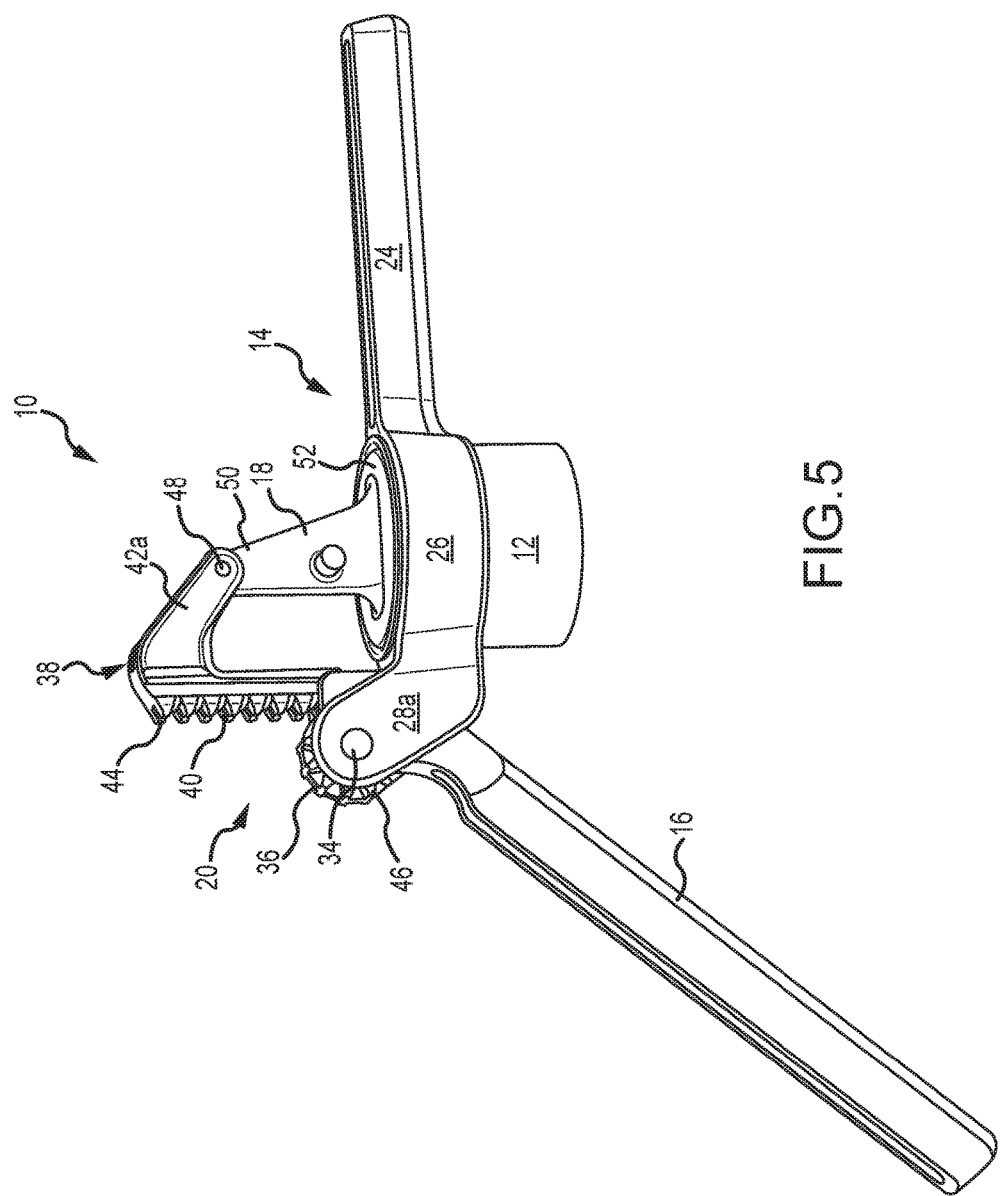
FIG. 5 is an isometric view of the apparatus of FIG. 1, illustrating the apparatus in an "open" state with the piston in a "down" state.
Figure 6:
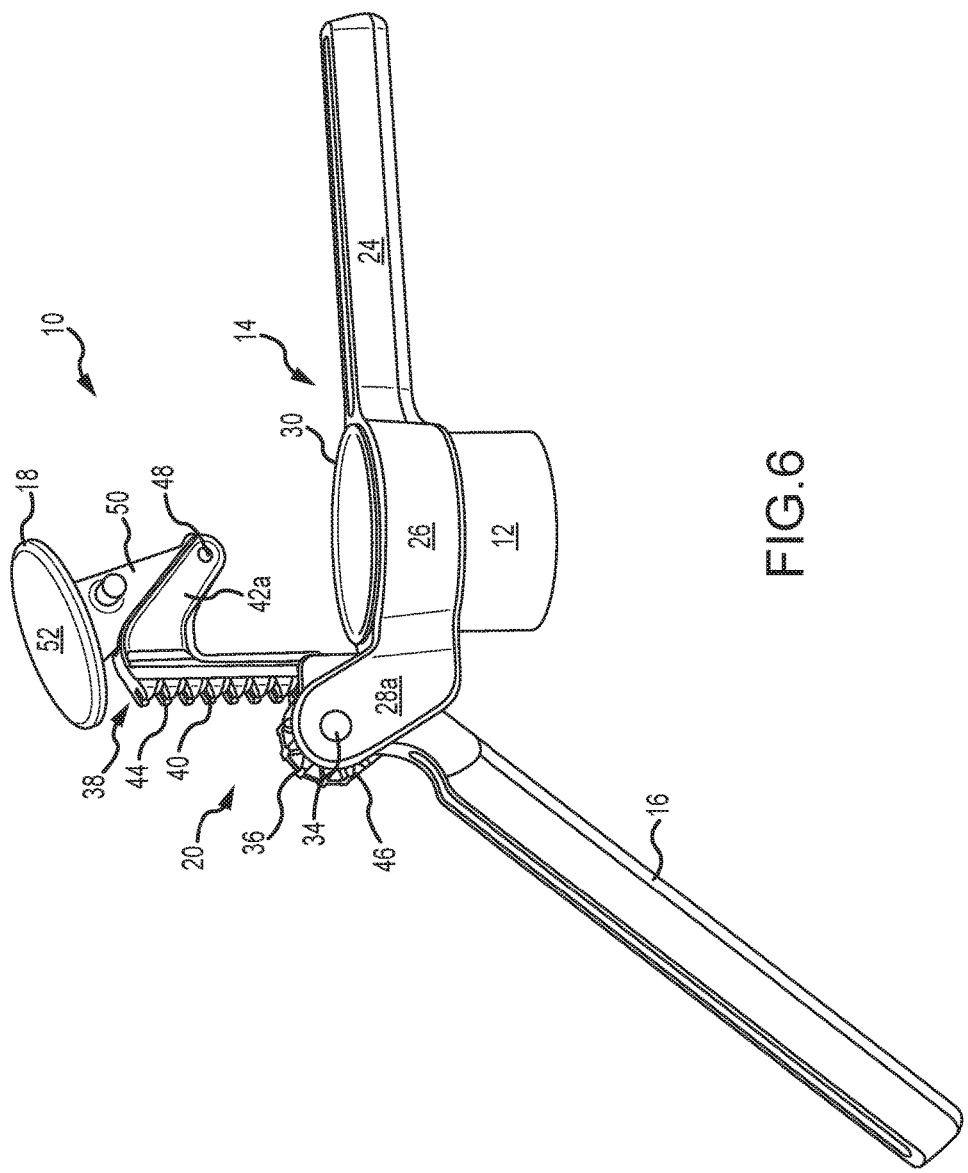
FIG. 6 is an isometric view of the apparatus of FIG. 1, illustrating the apparatus in an "open" state with the piston in an "up" state.
Figure 7:
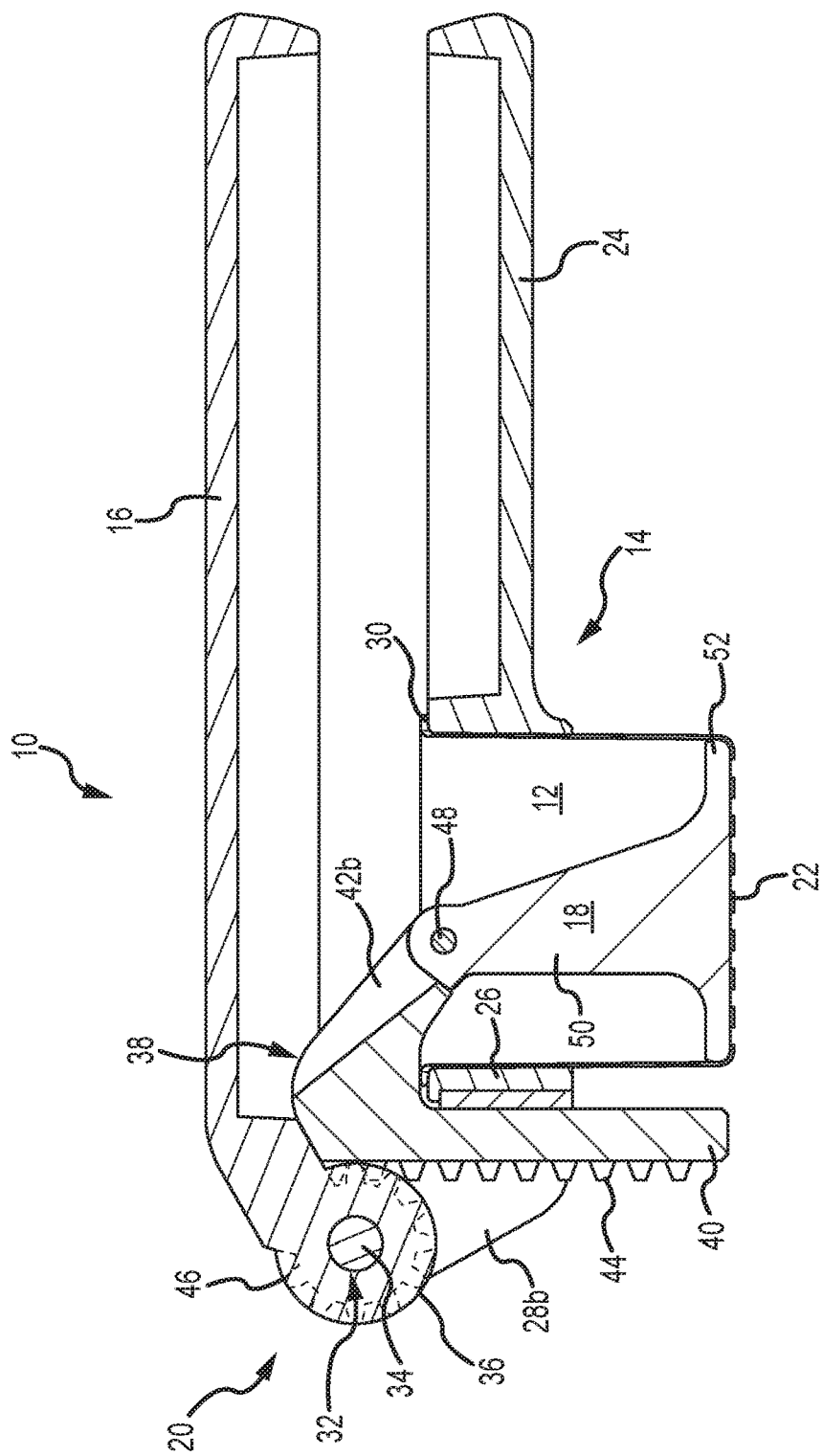
FIG. 7 is a cross-sectional view of the apparatus of FIG. 1, taken along line 7-7 in FIG. 1, illustrating the apparatus in a "closed" state.

Referring to the drawings, wherein like reference numerals refer to the same or similar features in the various views, FIGS. 1-7 are various views of an apparatus 10 for compressing food. The apparatus may be, for example, a potato ricer, garlic press, citrus juicer, or other device for compressing food.

Features of the exemplary apparatus embodiment 10 will now be described. It should be understood that, although the features will be described in definite terms such as "is" and "are," the features described are exemplary in nature only and do not serve to limit the apparatus except as set forth in the claims.

The apparatus 10 includes a receptacle 12, a handle assembly 14, a lever 16, a piston 18 (best illustrated in FIGS. 5-7), and a rack-and-pinion assembly 20. When the lever 16 is actuated, the rack-and-pinion assembly 20 translates movement of the lever 16 into movement of the piston 18 into and out of the receptacle 12 to compress food within the receptacle 12.

The receptacle 12 is configured in size and shape for receiving one or more items of food. The receptacle 12 is a circular cylinder or generally circular and cylindrical, in the illustrated embodiment. The receptacle may be sized to receive a potato, lemon, clove of garlic, or other food, whole or in pieces. In other embodiments, the receptacle 12 may have another shape or size appropriate for an intended use. For example, the receptacle 12 may have a cross-section that is polygonal, oval, or some other shape. That is, the receptacle may be an oval cylinder, a rectangular polyhedron, or some other shape. The receptacle 12 may have the same diameter from top-to-bottom, as in the illustrated embodiment of the apparatus 10, or may have a variable diameter, in another embodiment.

A grate or grating 22 (illustrated in FIGS. 4 and 7) is provided at the bottom of the receptacle 12, in the illustrated embodiment. When the piston 18 is moved down into the receptacle 12 and compresses food in the receptacle 12, the food may be strained through the grating 22 to form smaller-diameter pieces of the food. The grate 22 includes a plurality of circular apertures arranged in a plurality of parallel rows, in the illustrated embodiment. In other embodiments, the grating 22 may have any size, number (e.g., one or more), and arrangement of apertures appropriate for a desired application. The apertures may be any appropriate shape, such as circular, rectangular, diamond, etc. In yet another embodiment, the grating 22 may be omitted, and the bottom of the receptacle 12 may be solid.

The handle assembly 14 is configured to be grasped by a user and to support the receptacle 12 and includes a handle 24, a retainer 26, and two link arms 28a, 28b (which may be referred to generically as "a link arm 28" or "the link arms 28"), in the illustrated embodiment. The handle 24 is configured to be received in a user's hand for stability and support while the apparatus 10 is operated. The retainer 26 is coupled directly to the handle 24, with the handle 24 extending proximally from the retainer 26, in the illustrated embodiment. The retainer 26 is an annular band configured to surround most, all, or substantially all of the circumference of the receptacle 12, in the illustrated embodiment. In another embodiment, the retainer 26 may have another appropriate shape or form. For example, the retainer 26 may be polygonal, oval, or some other shape (e.g., to match the shape of the receptacle 12). The handle assembly 14 (i.e., the handle 24, retainer 26, and link arms 28) are formed of a single piece of material, in the illustrated embodiment. In another embodiment, the handle assembly 14 may be formed from two or more pieces of material.

In the illustrated embodiment, the receptacle 12 is removably coupled with the retainer 26 so that the receptacle 12 may be removed and replaced for insertion and removal of food, for cleaning, for repair, etc. The receptacle 12 includes an upper flange 30 that extends over the top of the retainer 26, in the illustrated embodiment. In other embodiments, the receptacle 12 and/or the retainer 26 may include other physical features such as, for example, flanges, clips, protrusions, recesses, tacky surfaces, and the like, for securing the receptacle 12 to the retainer 26. In other embodiments, the receptacle 12 may be rigidly coupled with the retainer 26 (e.g., with adhesive). In still other embodiments, the receptacle 12 may be formed monolithically with the handle 24 (i.e., from a single body of material).

The handle assembly link arms 28 of the illustrated embodiment couple the retainer 26 with the rack-and-pinion assembly 20. Accordingly, the link arms 28 indirectly couple the receptacle 12 with the rack-and-pinion assembly (when the receptacle 12 is in the retainer 26), which in turn indirectly couples the receptacle 12 with the lever 16. The link arms 28 both extend distally from the retainer. The link arms 28 are parallel with each other and extend generally linearly at approximately a 70-degree angle from the direction of extension of the handle 24. Of course, in other embodiments, the link arms 28 may extend non-linearly (i.e., may be curved), may be non-parallel, or may otherwise be arranged differently than in the illustrated embodiment. Still further, in other embodiments, more or fewer than two link arms 28 may be provided. For example, in an embodiment, a single link arm 28 may be provided.

Each link arm 28 includes a distal aperture through which a hub 34 (e.g., a pin) is inserted, in the illustrated embodiment. In the illustrated embodiment, a single hub 34 extends through the two link arms 28a, 28b to couple the link arms 28 to the rack-and-pinion assembly 20.

The lever 16 is rotatably, hingedly coupled to the handle assembly 14 and to the receptacle 12 (such coupling is via the hub 34) and extends generally parallel to the handle 24, in the illustrated embodiment. The lever 16 may be rotated by a user to cause the piston 18 to extend into and out of the receptacle 12. The lever 16 is configured for a range of motion sufficient to move the piston 18 between a closed position in which the piston 18 is flush with the bottom of the receptacle (illustrated in FIGS. 1-4 and 7) and an open position in which the piston 18 is completely removed from the receptacle 12 (illustrated in FIGS. 5 and 6).

The rack-and-pinion assembly 20 is disposed at the distal end of the lever 16 and the distal end of the handle assembly 14 and includes a circular gear 36 (the "pinion" of the rack-and-pinion assembly) and a linear gear assembly 38, in the illustrated embodiment. The circular gear 36 may be rigidly coupled with the lever 16. In the illustrated embodiment, the circular gear 36 is formed integrally with the lever 16. That is, the circular gear 36 and the lever 16 are formed from a single body of material. In another embodiment, the circular gear 36 and the lever 16 may be formed from two or more bodies of material and may be separable. In the illustrated embodiment, the circular gear 36 encompasses approximately 270-degrees of the distal end of the lever 16. The circular gear 36 includes a central aperture 32 (shown in FIG. 7) through which the hub 34 extends, in the illustrated embodiment. Accordingly, the circular gear 36 rotates about the hub 34.

The linear gear assembly 38 includes a linear gear bar 40 (the "rack" of the rack-and-pinion assembly) and two link arms 42a, 42b (which may be referred to generically as "a link arm 42" or "the link arms 42"), in the illustrated embodiment. The linear gear bar 40 and the two link arms 42 are formed from a single body of material, in the illustrated embodiment. In another embodiment, the linear gear bar 40 and the two link arms 42 may be formed from two or more pieces of material. The linear gear bar 40 moves, and extends, generally parallel to the direction of propagation of the piston 18 into and out of the receptacle 12. In another embodiment, the linear gear bar 40 may extend at another angle.

Both the linear gear bar 40 and the circular gear 36 have a plurality of teeth, with the teeth 44 of the linear gear bar 40 configured to engage the teeth 46 of the circular gear 36. In the illustrated embodiment, the teeth 44 of the linear gear bar 40 and the teeth 46 of the circular gear 36 are arranged in two parallel rows. In other embodiments, the teeth 44, 46 may be arranged in a single row, or in more than two rows, as desired for a particular application. Due to the mutual engagement of the teeth 44 of the linear gear bar 40 and the teeth 46 of the circular gear 36, rotational movement of the circular gear 36 is translated into linear movement of the linear gear bar 40, and vice-versa.

The rack-and-pinion assembly link arms 42 extend proximally from the linear gear bar 40 and couple the linear gear bar 40 to the piston 18, in the illustrated embodiment. The piston 18 is rotatably, hingedly coupled to the link arms 42 and is therefore rotatably, hingedly coupled with the handle assembly 14. Each link arm 42 includes a proximal aperture through which a hub 48 (e.g., a pin) is inserted, in the illustrated embodiment. In the illustrated embodiment, a single hub 48 extends through the apertures in both link arms 42 and couples the link arms 42 to the piston 18.

The piston 18 includes a piston rod 50 and a piston head 52. The piston head 52 is generally circular with a diameter that is substantially the same as the inner diameter of the receptacle 12, in the illustrated embodiment. In other embodiments, the piston head 52 may have another shape to correspond to the shape of the receptacle 12 or for some other purpose. The piston rod 50 is rigidly coupled with the piston head 52. In the illustrated embodiment, the piston rod 50 and the piston head 52 are formed from a single body of material. In other embodiments, the piston rod 50 and piston head 52 may be formed from two or more pieces of material.

The piston rod 50 is rotatably, hingedly coupled to the link arms 42 through the hub 48. As a result, the piston 18 can rotate between a first, "down" state (shown in FIGS. 1, 2, 5, and 7) in which the piston 18 hangs below the link arms 42 and may be moved into and out of the receptacle 12 and a second, "up" state (shown in FIG. 6). With the piston 18 in the "up" state, food may be placed into the receptacle 12. Further, with the piston 18 in the "up" state, the receptacle 12 may be inserted into and removed from the retainer 26 for cleaning or replacement.

The handle assembly 14, lever 16, rack-and-pinion assembly 20, and piston 18 are made from plastic or polymer, in one embodiment. In another embodiment, the handle assembly 14, lever 16, rack-and-pinion assembly 20, and/or piston 18 are made from metal or another appropriate material, or a mix of materials. The receptacle 12 is made from metal, in one embodiment. In another embodiment, the receptacle 12 is made from plastic or polymer or another appropriate material or a mix of materials.

The piston 18 is mechanically coupled with the lever 16 through the rack-and-pinion assembly 20, in the illustrated embodiment. Accordingly, the lever 16 may be used to apply force to the piston, as described below.

In operation, starting with the apparatus 10 in the closed position illustrated in FIGS. 1-4 and 7, a user may grasp the handle 24 and the lever 16 and apply a distally-oriented rotational force to the lever 16. The lever 16 rotates around the hub 34 in the link arms 28 of the handle assembly 14, and the user's rotational force on the lever 16 is translated by the rack-and-pinion assembly 20 into an upward linear force on the piston 18. Once the piston 18 is removed from the receptacle 12 (illustrated in FIG. 5), the user may move the piston 18 from a "down" state (also illustrated in FIG. 5) to an "up" state (illustrated in FIG. 6) by rotating the piston 18 around the hub 48 through the link arms 42 of the rack-and-pinion assembly 20. With the piston 18 "up," the user may place food in the receptacle 12. The user may then move the piston 18 "down," and apply a proximally-oriented rotational force to the lever 16. The rack-and-pinion assembly 20 translates the rotational force into a downward linear movement of the piston 18 into the receptacle 12. The user may continue to apply proximal rotational force to the lever 16 to compress the food between the piston 18 and the grating 22. As a result of the compression, the food may be pressed out of the grating 22 in smaller-diameter pieces than the original food placed in the receptacle 12.

The rack-and-pinion assembly 20 of the apparatus 10 provides increased compression force over known food compression devices. The increased compression force results both from the use of a rack-and-pinion assembly 20 as well as the parallel arrangement of the linear gear bar 40 with the direction of movement of the piston 18. The parallel arrangement results in the force vector on the piston 18 being directly into the receptacle 12, so minimal piston force is directed into the wall of the receptacle, unlike known designs. Testing of a potato ricer prototype of the apparatus 10 confirmed that the apparatus provides a more than 50% increase in compression force over known designs. As a result, a user may more effectively and quickly compress food relative to known food compression device designs.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure. As used herein, the phrased "configured to," "configured for," and similar phrases indicate that the subject device, apparatus, or system is designed and/or constructed (e.g., through appropriate components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An apparatus for compressing food, comprising:
    a handle assembly;
    a receptacle, coupled to the handle assembly, for receiving the food, the receptacle defining an interior and having an exterior, the receptacle comprising a sidewall having an interior side and an exterior side;
    a lever;
    a piston; and
    a rack-and-pinion assembly coupled to the lever, to the piston, and to the handle assembly such that actuation of the lever is converted by the rack-and-pinion assembly into movement of the piston into and out of the receptacle,
    wherein the rack-and-pinion assembly comprises:
    a circular gear; and
    a linear gear assembly;
    wherein the piston is coupled with the linear gear assembly by way of a hinge;
    and
    wherein actuation of the lever causes movement of the linear gear assembly along the exterior side of the sidewall with respect to the receptacle.

2. The apparatus of claim 1, wherein:
    the circular gear is rigidly coupled with the lever and has a plurality of teeth; and
    the linear gear assembly is coupled with the piston and has a plurality of teeth, wherein the teeth of the linear gear assembly are configured to engage the teeth of the circular gear.

3. The apparatus of claim 2, wherein the linear gear assembly comprises a linear gear bar and a link arm, the link arm coupled to the piston.

4. The apparatus of claim 3, wherein the linear gear bar is arranged parallel to a direction of the movement of the piston into and out of the receptacle and the link arm extends laterally from a first end coupled with the linear gear bar and a second end coupled with the piston.

5. The apparatus of claim 2, wherein the circular gear and the lever are formed from a single body of material.

6. The apparatus of claim 1, wherein the handle assembly comprises:
    a retainer configured to retain the receptacle;
    a handle coupled to and extending proximally from the retainer; and
    a link arm coupled to and extending distally from the retainer, the link arm hingedly coupled with the lever.

7. The apparatus of claim 6, wherein:
    the circular gear is rigidly coupled with the lever and has a plurality of teeth; and
    the linear gear assembly is coupled with the piston and has a plurality of teeth, wherein the teeth of the linear gear assembly are configured to engage the teeth of the circular gear;
    further wherein the circular gear is coupled to the link arm through a hub.

8. The apparatus of claim 1, wherein the receptacle has an opening through which the piston enters the receptacle and a bottom comprising a grate.

9. The apparatus of claim 8, wherein the grate comprises one or more of:
    a plurality of circular apertures;
    a plurality of rectangular apertures; or
    a plurality of diamond-shaped apertures.

10. An apparatus for compressing food, comprising:
    a handle assembly comprising a handle and a retainer;
    a receptacle for the food, the receptacle retained by the retainer, the receptacle defining an interior and having an exterior, the receptacle comprising a sidewall having an interior side and an exterior side;
    a lever hingedly coupled with the handle assembly;
    a piston; and
    a rack-and-pinion assembly coupled to the lever and to the piston such that actuation of the lever is converted by the rack-and-pinion assembly into movement of the piston into and out of the receptacle and wherein the lever is substantially parallel with the handle when the piston is in a closed position in the receptacle and wherein actuation of the lever causes movement of the linear gear assembly along the exterior side of the sidewall.

11. The apparatus of claim 10, wherein the rack-and-pinion assembly comprises:

a circular gear rigidly coupled with the lever, hingedly coupled with the handle assembly, and having a plurality of teeth; and a linear gear assembly coupled with the piston and having a plurality of teeth, wherein the teeth of the linear gear assembly are configured to engage the teeth of the circular gear.

12. The apparatus of claim 11, wherein the handle assembly further comprises a link arm, the circular gear hingedly coupled with the link arm.

13. The apparatus of claim 12, further comprising a hub that couples the link arm to the circular gear.

14. The apparatus of claim 11, wherein the teeth of the circular gear and the teeth of the linear gear assembly are each arranged in two parallel rows.

15. The apparatus of claim 11, wherein the linear gear assembly comprises a linear gear bar and a link arm, the link arm coupled to the piston.

16. The apparatus of claim 15, wherein the linear gear bar is arranged parallel to a direction of the movement of the piston into and out of the receptacle and the link arm extends laterally from a first end coupled with the linear gear bar to a second end coupled with the piston.

17. The apparatus of claim 10, wherein the receptacle has an opening through which the piston enters the receptacle and a bottom comprising a grate.

18. The apparatus of claim 17, wherein the grate comprises one or more of:

a plurality of circular apertures;

a plurality of rectangular apertures; or a plurality of diamond-shaped apertures.

19. The apparatus of claim 10, wherein the receptacle comprises a cylinder or a rectangular polyhedron.

* * * * *